(12) United States Patent
Ogasawara (10) Patent No.: US 7,240,343 B2
(45) Date of Patent: Jul. 3, 2007

(54) SYSTEM AND METHOD FOR HANDLING AN EXCEPTION IN A PROGRAM

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 10/189,040

(22) Filed: Jul. 3, 2002

(65) Prior Publication Data

US 2003/0018961 A1 Jan. 23, 2003

(30) Foreign Application Priority Data

Jul. 5, 2001 (JP) .............................. 2001-205167

(51) Int. Cl.
G06F 9/45 (2006.01)
(52) U.S. Cl. ...................................... 717/158; 717/154
(58) Field of Classification Search ................ 717/140, 717/158, 151, 153, 154; 712/244
See application file for complete search history.

(56) References Cited

U.S. PATENT DOCUMENTS

| | | | | |
|---|---|---|---|---|
| 5,835,702 | A * | 11/1998 | Levine et al. ................ | 714/39 |
| 6,070,009 | A * | 5/2000 | Dean et al. ................. | 717/130 |
| 6,631,515 | B1 * | 10/2003 | Berstis ........................ | 717/140 |
| 6,662,359 | B1 * | 12/2003 | Berry et al. ................. | 717/130 |
| 6,718,543 | B2 * | 4/2004 | Arai et al. ................... | 717/158 |
| 6,886,094 | B1 * | 4/2005 | Blandy ........................ | 712/244 |
| 2002/0083163 | A1 * | 6/2002 | Collazo ....................... | 709/223 |
| 2002/0112227 | A1 * | 8/2002 | Kramskoy et al. .......... | 717/148 |
| 2002/0165848 | A1 * | 11/2002 | Rautenbach et al. ......... | 707/1 |

FOREIGN PATENT DOCUMENTS

JP PUPA 133884 5/1998

(Continued)

OTHER PUBLICATIONS

Flanagan, "Java in a nutshell", Nov. 1999, O'Reilly, Third Edition, Chapter 1 (16 pages), Chapter 12 (61 pages). Online version can be obtained at <http://www.unix.org.ua/orelly/java-ent/jnut/index.htm>.*

(Continued)

Primary Examiner—Tuan Dam
Assistant Examiner—Thuy Dao
(74) Attorney, Agent, or Firm—Anne Vachon Dougherty (57) ABSTRACT

A technique for improving the execution speed of a computer system by effectively reducing the costs to perform a search operation for an exception handler during the exception handling process is established. A computer system comprises 1) a compiler for compiling a program written in a programming language having an exception handling mechanism and 2) an execution unit for executing the compiled program. The execution unit calculates an occurrence frequency of an execution context in which a search operation for an exception handler is performed for execution handling, and determines the execution context to be optimized based on the frequency data. The compiler determines the exception handler for handling an exception that occurs in the above execution context, and generate a code describing a process path from a point that throw the exception in said execution context to the exception handler. Specifically, the compiler deletes the code that throws the exception, and generates a code that branches to the corresponding exception handler.

8 Claims, 7 Drawing Sheets

FOREIGN PATENT DOCUMENTS

| JP | PUPA 020320 | 1/2000 |
| --- | --- | --- |
| JP | PUPA 035890 | 2/2000 |
| JP | PUPA 122875 | 4/2000 |
| JP | PUPA 222242 | 8/2000 |
| JP | PUPA 520415 | 10/2001 |
| JP | PUPA 306331 | 11/2001 |
| JP | PUPA 149416 | 5/2002 |

OTHER PUBLICATIONS

"Efficient Java Exception Handling in Just-in-Time Compilation", Lee et al., Jun. 2000, 8 pages. [Online] [Retrieved at] <citeseer.ist.psu.edu/376163.html>.*

"Practicing JUDO: Java under Dynamic Optimizations", Ciemiak et al., 2000, 14 pages. [Online] [Retrieved at] <portal.acm.org/ft_gateway.cfm?id=349306&type=pdf&coll=&dl=ACM&CFID=15151515>.*

"A study of exception handling and its dynamic optimization in Java", Ogasawara et al., IBM Japan, 2001 (13 pages). [Online] [Retrieved at] <citeseer.ist.psu.edu/ogasawara01study/html>.*

"Design, Implimentation and Evaluation of Optimizations in a Java Just—In —Time Comiler".

Java Quick Reference. 3$^{rd}$ ed. Dec. 20, 2000, p. 73-79.

* cited by examiner

Exception path: p = {(A, a1), (B, b1), (C, c1), (D, d1)}
Exception profile: pf = {p, start_time=100, count=500}
current time=100100
Exception frequency: F(pf) = count/(current_time-start time) = 1/200
Exception priority: P(pf) = F(pf) = 1/200
Exception priority threshold: 1/200

SYSTEM AND METHOD FOR HANDLING AN EXCEPTION IN A PROGRAM

BACKGROUND OF THE INVENTION

1. Field of the Invention

The present invention relates to a computer program optimization method, in particular, to a method for reducing exception handling costs.

2. Description of the Related Art

Of the programming languages in common use today, there are some that treat excessive ranges of data entries or process results as "exceptions", and handle such exceptions (exception handling). The currently popular Java* language is representative of those that support exception handling (*trademark of Sun Microsystems). Exceptions are roughly sorted into two types. One type is the occurrence of a program status that prevents the continued execution, and the other type is the occurrence of a program status wherein the main control flow in an algorithm is unexpectedly shifted. A convenient method that is often employed to generate an exception handling sequence is one that performs a complicated, reliable procedure to recover from an exception of the second type, whereby the program control flow has been shifted.

The exception handling in Java in this respect will now be briefly explained. In Java, one "try" block is correlated with one or more "catch" blocks, which are so-called handlers (exception handlers), and have exception classes that can be processed as attributes. To continue the execution of a program following the occurrence of an exception, the exception which has occurred in a predetermined try block is thrown, and caught and handled by a matching catch block for the pertinent exception class. Typically, the following steps are performed during exception handling. Firstly, when an exception has occurred in a computer system (hereinafter referred to simply as a system) in which Java codes are implemented as components, the system generates an object of an exception class and initializes the object. Since, in Java, it is defined that a stack trace at that time can be referred to by the exception object, a stack trace is generated at the time of initialization. Then, the exception object is defined as operand, and "athrow" byte code, used to throw an exception, is executed, and in this way the system is set in an exception state.

In the exception state, the system searches for a try block that covers the athrow byte code that has thrown the exception. When the system finds such a try block, the system sequentially examines catch blocks on the list that correspond to the try block to determine whether there is a catch block that can process the current exception class. If such a catch block is found, program control is shifted to that catch block to continue the execution of the program. If no such catch block is found, in the same manner, the system continuously searches for an external or other try block until it finds an appropriate one.

The costs for the exception handling while the program is being executed can be roughly sorted into the cost in search operation for an exception handler (search cost) and the cost in generating and initializing the exception object (generation cost). A conventional technique for reducing the search cost involved in a search made for an exception handler is disclosed in Document 1.

Document 1:

"Efficient Java Exception Handling in Just-in-Time Compilation", S. Lee, B.-S. Yang, S. Kim, S. Park, S.-M. Moon and K. Ebcioğglu, in Proceedings of the ACM 2000 Conference on Java Grande, pp. 1–8, New York, N.Y., U.S.A., June 2000 ACM, ACM Press According to the technique disclosed in this document, firstly, at a point where an exception is thrown, program control branches unconditionally to an exception handler that is predicted without throwing the exception. Then, at the top of the exception handler, a check is performed to determine whether the class of an exception object can be processed by the exception handler. When the class of the exception object can be processed by the exception handler, the process is continued. But when the class of the exception object can not be handled, the exception is actually thrown.

Further, a conventional technique for reducing the process cost for the generation and initialization of an exception object is disclosed in reference document 2.

Document 2

"Practicing JUDO Java Under Dynamic Optimizations", M. Cierniak, C. Y. Lueh and J. M. Stichnoth, in ACM SIGPLAN '00 Conference on Programming Language Design and Implementation [2], pp. 18–31.

According to the technique disclosed in Document 2, an exception that has occurred is analyzed, and when a compiler ascertains that the generation of an exception object and the performance of the initialization process have no side-effects, and that the compiler does not use an exception handler that is found for an exception object, the generation and initialization of the exception object are eliminated.

As a general idea of the exception handling for a certain program, it is assumed that exceptions seldom occur during execution and that, even if exception handling is required, it can be performed within an extremely short time in an execution period of the program. Thus, it is assumed that the program execution speed can be increased by not imposing heavy overhead for exception handling in sections that no exceptions occur.

Typical methods for searching for an exception handler are a stack unwinding method and a structured exception handling method. According to the stack unwinding method, an exception handler that can catch an thrown exception is searched for, and the stack is traced from the last frame to the preceding frames. In a frame that is optimized to increase the exception handling speed based on the above general idea, information that is unnecessary unless an exception occurs is not included, and in some cases data on program counter is only described therein. Information concerning the frame (whether an exception handler is present, whether a lock is to be released, or whether a callee-saved register is to be recovered) is obtained by searching a code information structure database for a code information structure that corresponds to the program counter. Further, in order to proceed with the stack unwinding, it is first necessary to recover a callee-saved register or to determine whether a current exception can be caught by a frame including an exception handler. Therefore, when an exception occurs, the cost for performing a search for an exception handler can be increased.

Furthermore, according to the structured exception handling method, even if an exception does not occur, a frame including an exception handler is always registered in an execution context. Thus, by skipping those frames that do not include exception handlers when a search operation for an exception handler is performed, the cost for performing the search can be reduced.

As is described above, for a programming language such as Java that supports exception handling, it is relatively easy to generate a robust program. However, reducing the overhead required by exception handling is a critical problem, because a run-time library is usually used to process an exception, and thus, it causes a large amount of processing cost.

For exception handling, it is assumed under the above described idea that, while also assuming that exceptions seldom occur, no overhead for exception handling is required for the section where no exception occurs. However, with the situation that presently exists, wherein exception types that change the control flow of a program tend to be employed in order to easily generate a robust program, deterioration of the execution speed cannot be avoided if a system is designed on the assumption that exceptions seldom occur.

Actually, there are many applications that cause so many exceptions that affect the execution speed of a system. And while most of these exceptions are those that change the control flow, in many cases exception objects are not used. Among the costs incurred for exception handling, the costs for the generation of an exception object and for the performance of an initialization process can be reduced by employing the technique in document 2 and, depending on the application, by generating and reusing an exception object. As for the cost for searching for an exception handler, even if the technique in document 1 is employed, a determination process made to ascertain whether the prediction is correct or not becomes a new overhead. Further, in accordance with this technique, compensation is required in case that the prediction is wrong, though the prediction improves the processing speed. Thus, the costs for the generation and initialization of an exception object cannot be reduced, and the technique in document 1 is therefore not an appropriate countermeasure for reducing exception handling costs.

When the structured exception handling method is employed to perform a search for an exception handler, as is described above, the overhead required for the search can be reduced. However, another overhead is also required to register a frame including an exception handler to an execution context, and when an exception handler is available for a method that is frequently called, the execution speed of the system is drastically deteriorated.

In order to reduce the costs involved in searching for an exception handler, at compile time, an optimization process may be performed to expand a method call inline, wherein an exception may occur. However, indiscreet inline expansion increases the amount of code explosively or deteriorates its quality by requesting more compiling resources. Further, in the dynamic compiling used in Java, memory capacity and the time required for compiling are increased considerably and program pause time is increased, and thus, dynamic compiling is not practical. Specifically, even if static optimization is performed for all the exception handler search processes that could occur, in many cases a reduction in the overhead that corresponds to the optimization cost cannot be obtained. Therefore, it is preferable to select and delete only the exception handler searches that actually occur at the time of execution and affect the execution speed of the system (inlining/inline expansion).

It is, therefore, one object of the present invention to improve the execution speed of a computer system by effectively reducing the costs incurred by a search operation for an exception handler during the exception handling process.

It is another object of the present invention to improve the execution speed of a computer system by optimizing a process that actually affects the execution speed of the system based on the execution frequency of search operations by an exception handler.

SUMMARY OF THE INVENTION

To achieve the above objects, in accordance with the present invention, the costs incurred for exception handling, especially the costs for searching for an exception handler, are effectively reduced when a program is written in a programming language having an exception handling mechanism. Specifically, the following two cost reduction techniques are proposed: 1) a technique for transforming code during a program compiling process to reduce the search cost for an exception handler, and 2) a technique for feeding back the execution state of a program and optimizing an appropriate exception path. These techniques can be separately employed, or can be employed together.

According to the invention, a system for executing a program written in a programming language having an exception handling mechanism is established. The system comprises: an acquisition unit for obtaining an exception path of an execution context wherein a search operation for an exception handler which handled an exception that has occurred during execution of the program; an exception profile unit for storing exception information including a number of exceptions which occurred in the exception path; a frequency calculator for calculating a frequency at which the exception occurred based on the stored exception information; and a determination unit for determining if the exception path is to be optimized based on the calculated frequency. More specifically, the frequency calculator calculates the frequency based on the number of exception occurrences within a predetermined time period.

Also the invention can be implemented by a system for compiling a program written in a programming language having an exception handling mechanism. This system comprises: an exception type analyzer for analyzing an exception type by simulating the program; an exception handler analyzer for searching for an exception handler that covers a location of the program at which the exception occurred and handles the exception; an exception flow analyzer for generating an exception flow by correlating an exception class with the exception handler found by the exception handler analyzer; and a code generator for generating a code connecting a code that throws the exception with the corresponding exception handler based on the exception flow. More specifically, the code generator deletes the code that throws the exception, and generates a code that branches to the corresponding exception handler.

The invention can also be implemented as a system comprising 1) a compiler for compiling a program written in a programming language having an exception handling mechanism and 2) an execution unit for executing the compiled program. The execution unit includes; means for calculating an occurrence frequency of an execution context wherein a search operation for an exception handler is performed for exception handling, and means for determining the execution context to be optimized based on said frequency. The compiler includes; means for determining the exception handler for handling an exception that occurs in said execution context, and means for generating a code describing a process path from a point that throws the exception in said execution context to the exception handler.

The present invention can also be implemented as a method or a program that controls a computer to provide the functions of the above described components. According to the present invention, an exception handling program is provided that enables a computer to perform exception handling relative to an exception that has occurred when a computer has executed a program written in an object-oriented programming language having an exception handling system, and that permits the computer to perform: a process for calculating a frequency at which an exception occurs as the program is executed by the computer, and for storing the frequency in storage means; and a process based on the frequency stored in the storage means for determining an execution context that is to be optimized and that is associated with the exception handling of the exception, and for registering the execution context to be optimized using a catch method for catching an exception corresponding to the execution context.

Further, according to the present invention, an exception handling method or program is provided that enables a computer to perform exception handling for an exception that occurs when the computer executes a program written in a programming language having an exception handling system, and that permits the computer to perform: a process for obtaining a dynamic frequency for an execution context wherein a search has been performed for an exception handler for the exception handling and for storing the dynamic frequency in storage means; and a process based on the dynamic frequency stored in the storage means for determining, as an optimization target, an execution context that occurs at a frequency exceeding a predetermined threshold value.

The dynamic frequency is obtained by counting the exception occurrences during each time period in which the program is executed, and by normalizing the occurrence count based on the code execution speed corresponding to the state wherein the program is executed.

According to the present invention, a conversion method or program is provided that enables a computer to convert into machine language code the source code for a program written in a programming language having an exception handling system, and that permits the computer to perform: a process for reading and analyzing the program for determining, relative to an exception path of the program along which predetermined exception handling is performed, an exception type at each location where an exception is thrown, and for determining which exception handler will receive the exception that is thrown at the location; and a process for generating code for a path from the location where the exception is thrown to the exception handler that will receive the exception.

In the process for determining the exception type and the exception handler, an exception path along which the exception handler is positioned that will catch the exception is inline-expanded for a catch method, and processing is performed for the interval extending from a method that includes the location where the exception is thrown to the catch method.

According to the present invention, a conversion method or program is provided that enables a computer to convert into machine language code the source code for a program written in a programming language having an exception handling system, and that permits the computer to perform: a process for reading the program and simulating the exception handling procedures that are performed upon the execution of the program; a process for employing the simulation results to determine which exception handler to use for handling an exception that has occurred; and a process for generating code for a process path until an exception that is thrown is obtained by the exception handler.

According to the present invention, a compiling method for dynamically performing a compiling process, including appropriate optimization, in accordance with the state wherein a computer executes a program, comprises the steps of: calculating an exception occurrence frequency where an exception occurs as the program is executed, and storing the occurrence frequency in storage means; employing the exception occurrence frequency stored in the storage means to determine an execution context for exception handling as an optimization target; reading out the program into the computer, simulating an exception handling process corresponding to the execution context determined as the optimization target, and determining an exception handler that handles the exception; and generating a code describing a direct path from a point where the exception is thrown to the exception handler.

DETAILED DESCRIPTION OF A PREFERRED EMBODIMENT OF THE INVENTION

The preferred embodiment will now be described in detail while referring to the accompanying drawings. Initially, an overview of the present invention will be given. In accordance with the present invention, the costs incurred for exception handling, especially the costs for searching for an exception handler, are effectively reduced when a program is written in a programming language having an exception handling system. In this invention, the following two cost reduction methods are proposed.

Method 1: Method for transforming code during a program compiling process to reduce the search cost for an exception handler.

Method 2: Method for feeding back the execution state of a program and optimizing an appropriate exception path.

These methods either can be separately employed, or can be employed together. When method 1 is independently employed, a search process is performed for an exception handler present in the program, without taking into account the execution state of the program. And when method 2 is employed independently, arbitrary optimization (e.g., inline conversion) can be performed for an appropriate exception path that is obtained by feeding back the execution state of the program. In either case, an effective reduction in the costs incurred for the performance of exception handling can be expected. But by combining these two methods, a greater effect can be obtained and the execution speed of the computer system on which the program is installed can be improved. The present invention can in general be employed for any program written in a programming language having an exception handling system, and thus, as a specific example, a program written in Java will be employed in the following explanation. An also, a description of the computer system is based on the system in which such program is installed.

Figure 1:
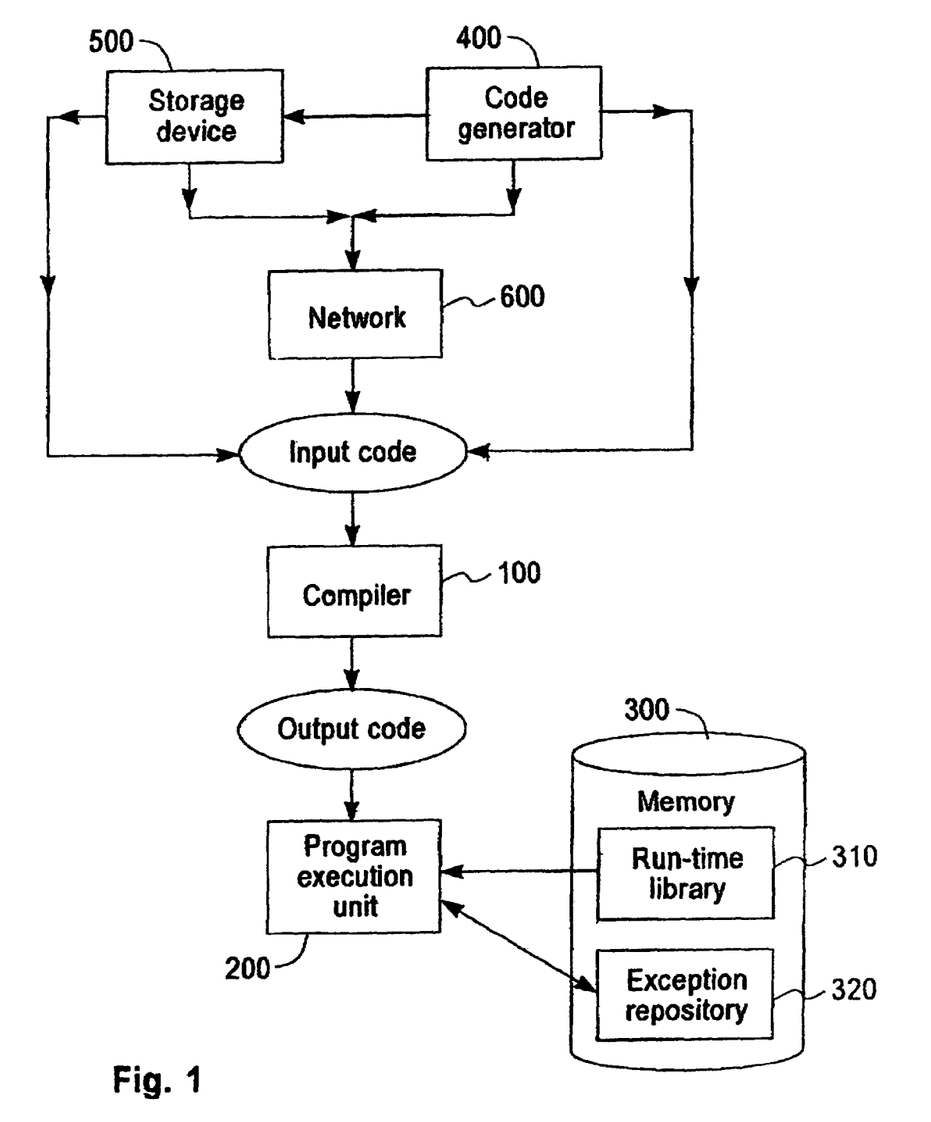
FIG. 1 is a diagram showing the configuration of a computer system that implements an exception handling, cost reduction method according to one embodiment of the present invention.

FIG. 1 is a diagram showing the configuration of a computer system that implements a method according to the preferred embodiment of the invention for the reduction of exception handling costs. In FIG. 1, a computer system according to the embodiment comprises: a compiler 100 for compiling input code; a program execution unit 200 for performing various processes using an object program (output code) that is compiled by the compiler 100; and a memory 300. The compiler 100 and the program execution unit 200 are implemented by a CPU under the control of a program employed for a computer system, such as a personal computer and a workstation. The memory 300 is the main memory of the computer, and is implemented as RAM. A run-time library 310, which is to be used by the program execution unit 200, is stored in the memory 300 wherein, although not shown, a program that enables the CPU to serve as the compiler 100 is also stored. Also, the run-time library 310, this program and an exception repository 320, which will be described later, may be stored as needed in a magnetic disk or another storage medium.

In FIG. 1, the compiler 100 receives and processes byte code, and generates and outputs machine language code. This byte code can be generated by a code generator 400 and input directly, or it can be retrieved from a storage device 500 wherein code generated by the code generator 400 is stored; or alternatively, it can be received from the code generator 400 or the storage device 500 via a network 600. In this embodiment, the compiler 100 may be either a dynamic compiler, such as a JIT (Just In Time) compiler for Java, which dynamically compiles an execution program at the time of execution, or a static compiler that complies a source program in advance and uses the obtained object program as an execution program.

The output code generated by the compiler 100 is executed by the program execution unit 200, and a run-time library 310 is called as needed. The run-time library 310 is used to store a program that performs exception handling at the time of execution, such as an exception handler. Of the two methods proposed for exception handling cost reduction, method 1 is performed by the compiler 100 and method 2 is performed by the program execution unit 200, mainly based on the exception handling performed by the run-time library 310 (or a portion of it which is expanded inline into the compiled code).

Figure 2:
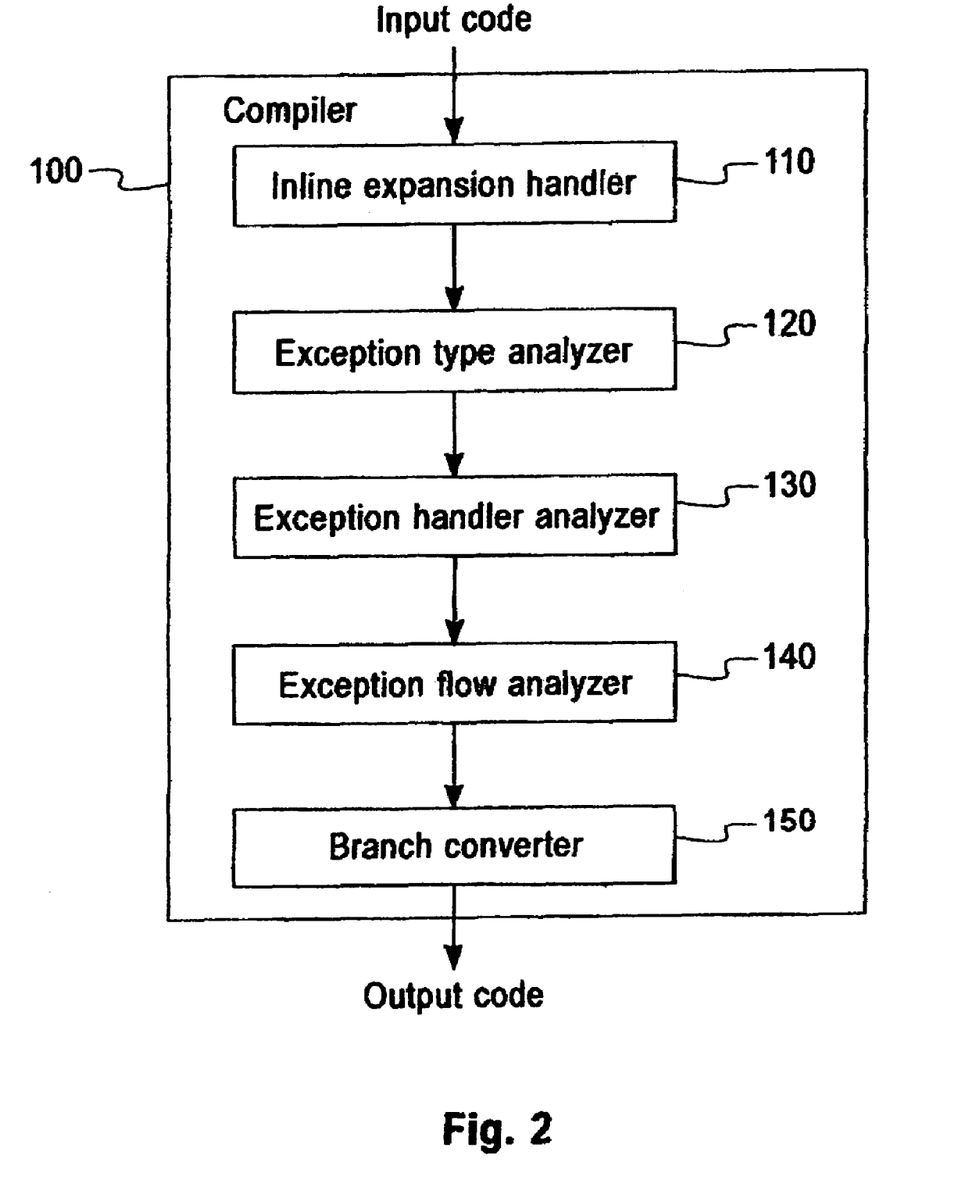
FIG. 2 is a diagram for explaining the configuration of a compiler according to the embodiment.

FIG. 2 is a diagram for explaining the configuration of the compiler 100 in this embodiment. In FIG. 2, the compiler 100 of this embodiment comprises: an inline expansion handler 110 for performing inline expansion for a method; an exception type analyzer 120 for analyzing the type of exception that occurs; an exception handler analyzer 130 for analyzing an exception handler present in a program; an exception flow analyzer 140 for generating an exception flow indicating a correlation between an exception class and an exception handler; and a branch converter 150 for generating code based on the exception flow generated by the exception flow analyzer 140. The individual components of the compiler 100 in FIG. 2 are virtual software blocks implemented by a CPU that is controlled by a computer program. The computer program for controlling the CPU can be distributed by being recorded on a storage medium, such as a CD-ROM or a floppy disk, or by being transmitted via a network. The components of the compiler 100 in FIG. 2 represent the characteristic functions of the embodiment. And although not shown, in actuality, the compiler 100 also includes general functions required for performing compiling processes, such as a lexical or syntax analysis of input code and generation of machine language code.

When the compiler 100 compiles a method, the inline expansion handler 110 searches for an exception path (a hot exception path) along which this method catches an exception, and performs inline expansion for the path. Further, in order to implement the exception handling cost reduction method of this embodiment, the optimization using inlining is not requisite; however, since the range for which the present invention is applied is expanded through optimization, the processing costs can be reduced even more.

When a program is compiled, the exception handling procedures in the program are simulated (attempted), and points (locations at which an exception has occurred) are found within each compiling unit where exceptions are apparently thrown. In this simulation, the exception type analyzer 120, the exception handler analyzer 130, the exception flow analyzer 140 and the branch converter 150 perform their processes respectively for each location or point where an exception is thrown. The compiling unit means a byte code sequence for a program, and typically, a byte code sequence of one method. Only the "athrow" byte code apparently throws an exception. However, since some applications throw many system exceptions, a system exception must be a target for optimization. In order to cope with this, the byte code that throws a system exception is interpreted as a special athrow code that throws a system exception + a condition test. An exception table provided for the byte code is used to designate the byte code range covered by each "try" block, an exception class that is handled by an exception handler corresponding to the "try" block, and the location of the entrance of the exception handler.

The exception type analyzer 120 analyzes exception type $T_p$ at each point p (location where an exception has occurred) where in the compiling unit an exception is apparently thrown. In this case, the exception type is a set of all the exception classes c that may be thrown, and in the following explanation, is referred to as $T_p=\{c_1, c_2, \ldots\}$.

The exception handler analyzer 130 searches for an exception handler that covers each location p at which in the compiling unit an exception is apparently thrown, and obtains a list of exception handlers. In the following explanation, the exception handler list is represented by $H_p=\{h_1, h_2, \ldots\}$.

At each point p where an exception in the compiling unit is apparently thrown, the exception flow analyzer 140 finds, by referring to the exception handler list obtained by the exception handler analyzer 130, an exception handler that can receive an exception, and correlates the exception handler with each exception class obtained by the exception type analyzer 120. This correlation of an exception class and an exception handler is called an exception flow. That is, the exception flow analyzer 140 constitutes correlation analysis means for determining an exception handler that catches each exception class, i.e., means for generating an exception flow that represents the correlation between the two. In the following explanation, the exception flow is represented by f=(c, h), and a set of exception flows at location p is represented by Fp={..., (ci, hj), ...}.

The branch converter 150 is code transformation means for, at each point p at which an exception is explicitly thrown in a compiling unit, for deleting code that throws the exception, and for generating, based on an exception flow (ci, hj) obtained by the exception flow analyzer 140, a code that branches to an exception handler corresponding to each exception class. When the code is deleted and generated for changing the exception handling process to the branching process, a compensation code is also generated as needed.

Figure 3:
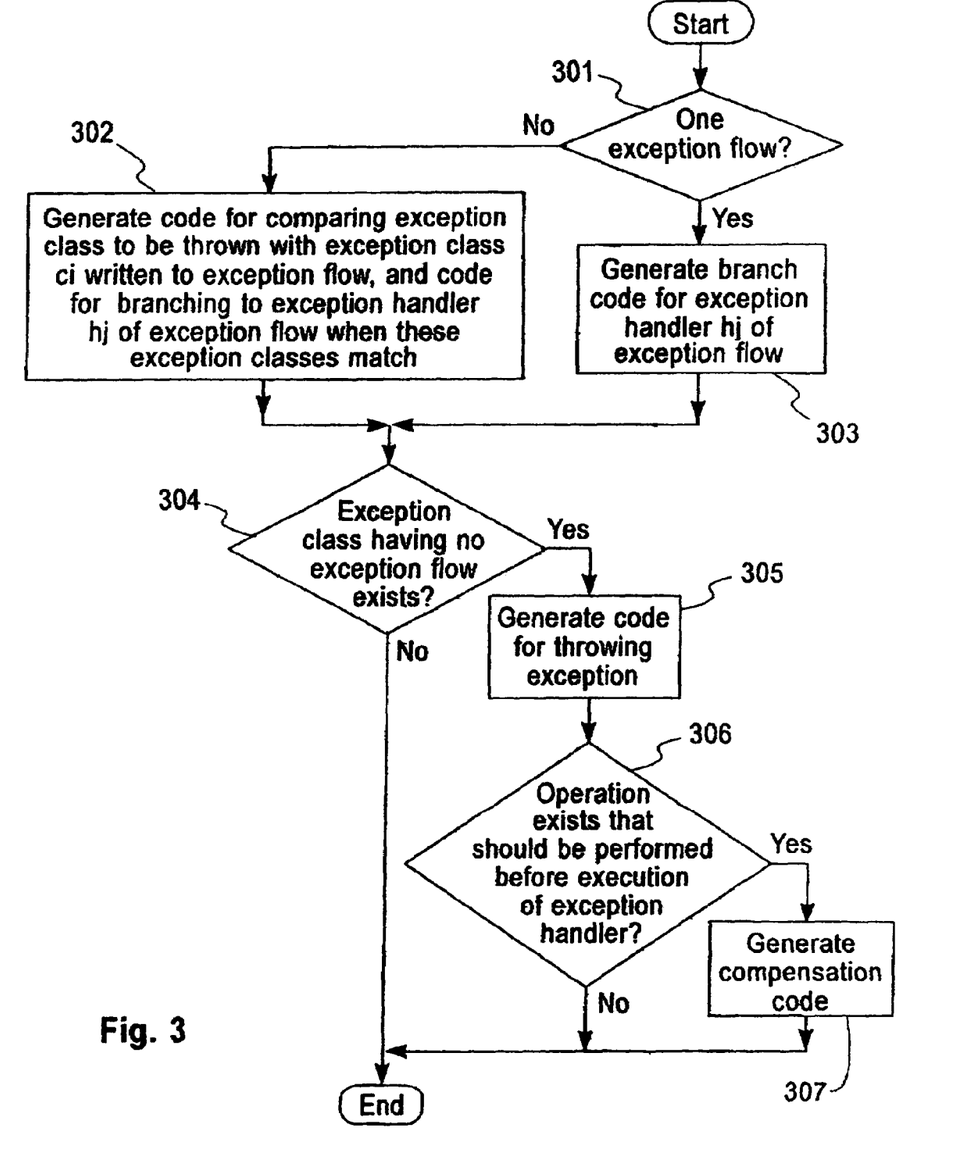
FIG. 3 is a flowchart for explaining the code generation process performed by the branch converter of the compiler in FIG. 2.

FIG. 3 is a flowchart for explaining the code generation performed by the branch converter 150. In FIG. 3, firstly, the branch converter 150 determines whether one or more exception flows are prepared by the exception flow analyzer 140 (step 301). When a plurality of exception flows are prepared, the following codes are generated: a code for comparing an exception class that is thrown with an exception class ci that is written in the exception flow, and a code for branching, if these exception classes are matched, to an exception handler hj in the exception flow. These codes are generated for each exception flow (step 302). If one exception flow is prepared, the comparison code is not necessary because it is apparent that the exception class that is thrown matches the exception class ci for the exception flow. Therefore, the only code for branching to the exception handler hj in the exception flow is generated (step 303).

The branch converter 150 then determines whether there is an exception class that does not have an exception flow (step 304). That is, the branch converter 150 determines whether there is an exception class that is an element of an exception type Tp, but is not included in an exception flow as an element of a set of exception flows Fp. If such an exception class exists, the branch converter 150 generates code that throws an exception (step 305).

If there is a process that must be performed after the code that throws an exception is executed and before the exception handler is executed, compensation code required for performing such process is inserted between the branch code to the exception handler and the exception handler (steps 306 and 307). Assume that a method call is optimized by inline expansion, the point p and the exception handler hi originally belong to different methods respectively, and a sync method call is included between these method calls. In this case, the lock acquired by the sync method is unlocked by using the compensation code.

As is described above, when the compiler 100 in this embodiment performs code conversion, the cost of performing a search for the exception handler can be completely removed from the exception handling costs accrued at the time a program is executed. In the compiling process, not only the optimization in this embodiment but also other various optimization and analysis processes therefor are performed. In such optimization and analysis processes, since there is an exception path, further analysis beyond the exception path cannot be performed, and optimization can be restricted due to the existence of the exception path. However, when in this embodiment the exception path is removed, more detailed analysis and better optimization can be performed.

Figure 4:
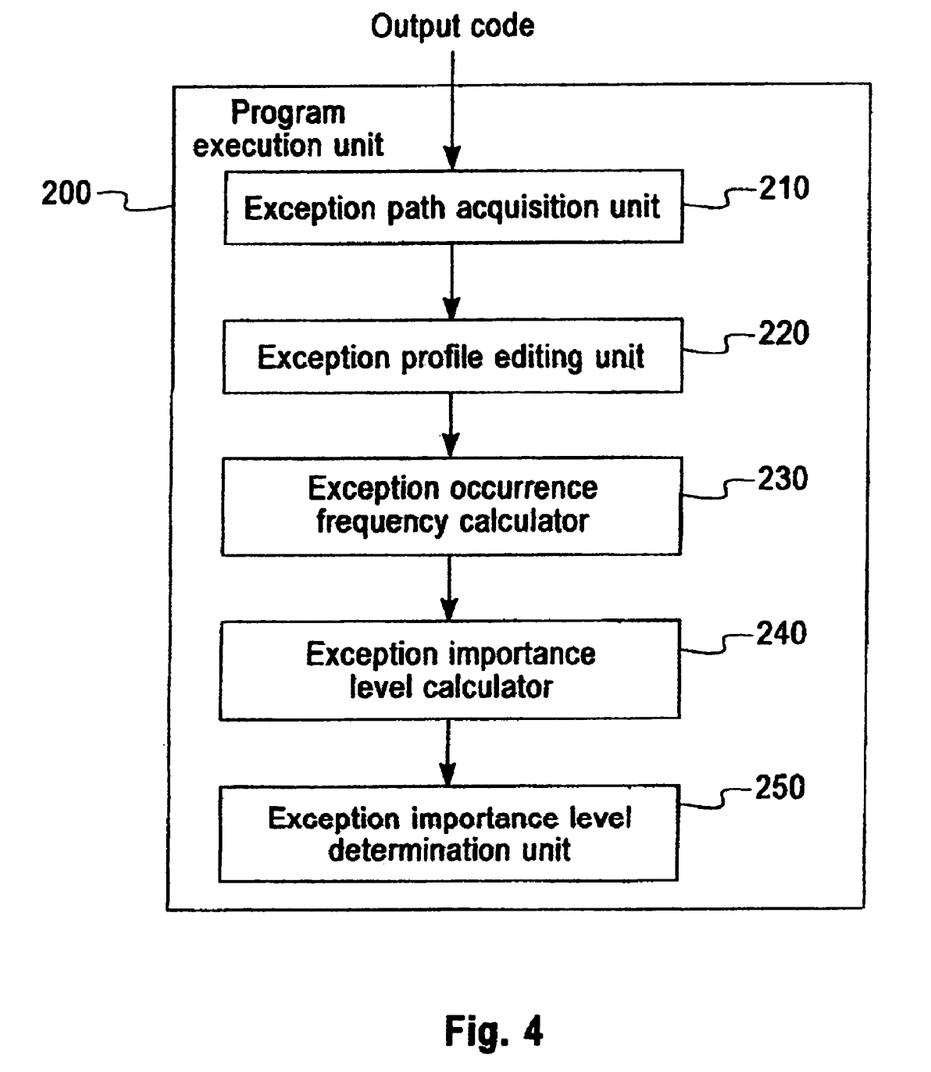
FIG. 4 is a diagram for explaining the arrangement of a program execution unit according to the embodiment.

FIG. 4 is a diagram for explaining the configuration of the program execution unit 200 of this embodiment. Based on a program (or a part thereof inline-expanded in a compiled compiling code) that is included in the run-time library 310 in the memory 300 and is used for exception handling, the program execution unit 200 in FIG. 1 is operated as an exception handling system and performs the processing sequence for exception handling. In FIG. 4, the program execution unit 200, which serves as an exception handling system, comprises: an exception path acquisition unit 210 for generating an exception path at the time exception handling is performed; an exception profile editing unit 220 for generating and updating an exception profile; an exception occurrence frequency calculator 230 for calculating the frequency at which exceptions occur; an exception importance level calculator 240 for calculating an importance level of an exception; and an exception importance level determination unit 250 for determining the importance level of an exception based on the exception occurrence frequency and for performing a corresponding process. The components in FIG. 4 are virtual software blocks implemented by a CPU (the program execution unit 200) that is controlled by the program included in the run-time library 310, as is described above. The program for controlling the CPU can be distributed by being stored on a storage medium such as a CD-ROM or a floppy disk, or by being transmitted via a network.

When an exception has occurred, normally, the program execution unit 200 that serves as an exception handling system searches for an exception handler by sequentially tracking back stack frames. When an exception handler is searched for, the exception path acquisition unit 210 obtains from the execution context in each frame a pair (a method context) consisting of a method designator and a location in the method of an instruction (code) that was last executed in the frame. If the code executed in the frame is inline-expanded code, multiple method contexts are obtained from the pertinent frame. At this time, the method contexts extending from the time the exception is thrown until it is caught are obtained, and is called an exception path. The exception path is an execution context that holds information concerning the exception handling.

The exception profile editing unit 220 generates an exception profile wherein exception occurrence information is attached to an exception path obtained by the exception path acquisition unit 210, and stores the exception profile in the exception repository 320 of the memory 300. If an exception profile having the same exception path is present in the exception repository 320, the exception occurrence information in the exception profile is updated. During this process, the number of exceptions that have occurred along the exception path or the time where the exception profile is created can be added as exception occurrence information.

The exception occurrence frequency calculator 230 calculates an exception occurrence frequency (dynamic frequency) based on exception occurrence information that is added to the exception profile. A simple example of exception occurrence frequency calculation method for preventing an increase in the exception handling costs is to divide the number of exception occurrences by the profile collection time. However, since the profile collection time is adversely affected by the system environment, from the viewpoint of serviceability, the number of exceptions can also simply be employed as the exception occurrence frequency. In this case, an operation is required for avoiding accumulation of the occurrence number of exceptions that occur at low frequencies for a long period of time. As an example, periodically the occurrence number is uniformly reduced by half, or the occurrence value is set to 0.

The exception importance level calculator 240 calculates the importance of an exception based on an exception path and on exception occurrence information stored in the exception profile. The importance level of an exception is the level used to determine whether a process for reducing the exception handling costs should be performed. It is ascertained that an exception having a high importance level affects the execution speed of a system, and that the cost reduction process should be performed. In the environment of Java and the dynamic compiler (JIT compiler), the method is initially performed at a low speed by an interpreter. When the program is repetitively executed, the program is compiled and optimized, and the resultant program is executed at a high speed. Therefore, the execution speed differs, even for the same method, depending on whether the original code is executed by the interpreter, the compiled code is executed, or the more optimized and compiled code is executed. Therefore, the occurrence frequency of an exception that is thrown by the code executed at a low speed has a different meaning from the occurrence frequency of an exception that is thrown by the code executed at a high speed, even if the exception occurrence frequencies are the same. For example, an exception that occurs once every 2000 cycles in case of execution by the interpreter only would occur at a frequency of several tens or hundreds of times if the compiled code is executed. Therefore, in order to obtain the importance level of an exception based on correct information, the exception importance level calculator 240 normalizes the exception occurrence frequency obtained by the exception occurrence frequency calculator 230, based on the execution speed of the code in the corresponding execution state.

The exception importance level determination unit 250 determines whether the exception importance level of the exception profile obtained by the exception importance level calculator 240 satisfies a specific determination condition. In this case, the determination condition can be applied to determine whether the exception importance level exceeds a predetermined threshold value. Next, the exception importance level determination unit 250 performs the following process for the exception path of an exception profile that satisfies the condition (e.g., exceeds the threshold value). That is, as is described above, the exception path is a series of method contexts, and the method context located at the end is always a method that catches an exception (a catch method) and an exception handler. Thus, an exception path that employs the method as a catch method is registered in this method.

Therefore, when an inline expansion is to be performed as a method for reducing the exception handling costs during the compiling process, the compiler 100 can expand the exception path registered in a certain method inline at the time of compiling the method. As a result, the point where an exception is thrown and the point where it is caught are placed in the same code segment. The compiler 100 can perform an appropriate optimization process whereby an exception is thrown in the same code segment, and thus optimize the exception handling. When this embodiment is implemented by a dynamic compiler, such as a JIT compiler, instead of compiling a catch method immediately when an exception path having a higher importance level (e.g., the exception occurrence frequency exceeds the threshold value) is obtained, the control process can be exercised so that, when other exception paths having the same catch method are subsequently obtained, the compiling of the catch method is delayed. As a result, the overhead due to the re-compiling of the program can be reduced.

As is described above, as methods for reducing the exception handling costs there are provided: a method (method 1) for, if the compiler 100 compiles a program, under the specific condition, transforming an exception handling path to a condition branch path, and for generating a code, so that program control is shifted directly from the location of the code where an exception is thrown to the location of an exception handler; and a method (method 2), for obtaining the occurrence history of exceptions during the execution by the program execution unit 200, employing the history to determine a predetermined path as an optimization target, and performing dynamic optimization at the time the compiling is performed. These two methods can be separately employed. That is, when method 1 is employed independently, the code can be transformed for all the methods whereby an exception can occur, regardless of the program execution state (the exception occurrence history). It should be noted that not all exception paths can be optimized, as in a case wherein an exception handler is not present in the method. However, for an entire program, the costs for searching for an exception handler can be reduced and the execution speed of the system can be improved.

When method 2 is employed independently, an optimization method need not be limited to method 1, and an exception path to be optimized (e.g. inline-expanded) can be determined. An exception path determined by method 2 is a path along which exceptions occur frequently at the time programs are executed and the exception handling is actually performed. Therefore, the exception path affects the execution speed of the system, and when this path is optimized, the execution speed of the system can be improved. That is, according to method 2, a mechanism can be provided that detects a hot execution path (or a method call) that affects the execution speed of a system while a program is actually being executed. When methods 1 and 2 are combined, an exception path that it is determined by method 2 is to be optimized is inlined, so that the application range for method 1 can be expanded.

In an environment, such as one in which a Java JIT compiler is used, wherein a program is compiled in accordance with the program execution state, or a program is newly optimized and re-compiled, it is relatively easy to perform the inline expansion or the optimization by method 1 by taking the current program execution state into account at the time of compiling. Therefore, an environment in which a dynamic compiler is employed is appropriate for the introduction of method 2. However, even in an environment wherein an object program that is complied in advance by a static compiler is provided for a system method 2 can be effectively employed, i.e., the exception history when exceptions have occurred while a program was being executed by the system is obtained, the re-compiling of the program, including optimization based on the history, is periodically performed, and an upgraded object program is re-distributed.

A specific example operation for the embodiment will now be described. Of the following four operations, example operations 1 and 2 are those performed by the program execution unit 200 for exception handling, and correspond to examples for the method 2 (feedback portion) for the reduction of the exception handling costs. Example operations 3 and 4 are those for code transformation when the compiler 100 compiles a program, and correspond to examples for the method 1.

EXAMPLE OPERATION 1

Figure 5:
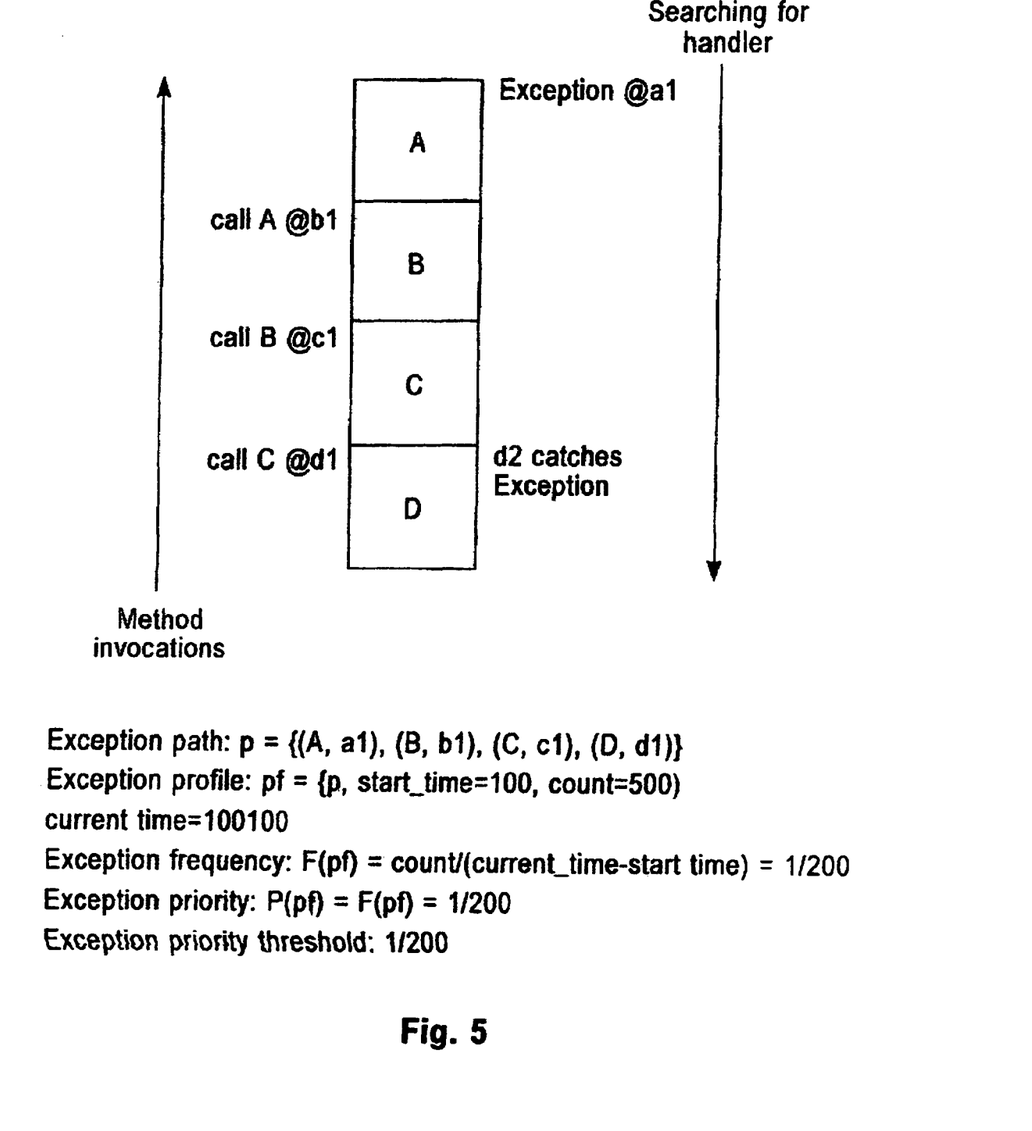
FIG. 5 is a diagram for explaining an operation for this embodiment and showing an example stack frame to be processed.

FIG. 5 is a diagram showing an example stack frame. The stack frame in FIG. 5 includes frames for four methods, A, B, C and D. In FIG. 5, method D calls method C at code location d1, method C calls method B at code location c1, method B calls method A at code location b1, and method A throws an exception at code location a1.

When an exception is thrown, generally, the exception path acquisition unit 210 of the program execution unit 200, which is an exception handling system, searches the stacks in the reverse direction for a frame having an exception handler that can handle the thrown exception. While searching for an exception handler, the exception path acquisition unit 210 identifies the search order and stores a method context. Assuming that the method context including method A and code location a1 is represented as (A, a1), the method context in which the exception handler is found, i.e., the exception path, is {(A, a1), (B, b1), (C, c1), (D, d1)}. This exception path is defined as p. Then, the exception profile editing unit 220 examines the exception repository 320 of the memory 300. When the exception path p is not registered as an exception profile in the exception repository 320, the exception profile editing unit 220 registers it as a new exception profile and provides, as exception occurrence information, start time (start_time=) 100 and occurrence count (count=) 0.

Assume that the program is executed subsequently and that exceptions occur repetitively. Then, each time an exception occurs the exception profile editing unit 220 finds an exception profile for the exception path p in the exception repository 320 and updates the occurrence count. Further suppose that the occurrence count reaches 500 at time 100100. At this time, the exception frequency is $1/200$ ($500/100000$). And if the exception frequency is defined as an exception importance level and the threshold value is $1/200$, the exception importance level of the exception profile reaches the threshold value. Therefore, through the processes performed by the exception occurrence frequency calculator 230 and the exception importance level calculator 240, the exception importance level determination unit 250 registers this exception path to the method D, which is an exception catch method, as the target for a process that is performed when the program is to be compiled later, in order to reduce the exception handling costs.

Therefore, if the inline expansion is employed as a method performed at the time of compiling (i.e. compiling of method D) to reduce the exception handling costs, the compiler 100 performs inline expansion of exception path p={(A, a1), (B, b1), (C, c1), (D, d1)} in method D, and arranges in the same code segment, point a1 where an exception is to be thrown, and point d2 where the exception is to be caught. The compiler 100 performs optimization for the case wherein when the point at which the exception is to be thrown and the point at which the exception is to be caught are present within the compile scope.

EXAMPLE OPERATION 2

In example operation 1, a time interval is employed to calculate an exception frequency. However, the time interval is easily affected by the exterior environment, especially, the simultaneous operation of another program. From the viewpoint of the serviceability of the program, the reproduction of the operation of the program is important. Therefore, an optimization process that includes a factor that is affected by the exterior environment is difficult to perform. Assume that, in the situation (see FIG. 5) shown in example operation 1 for example, only the exception occurrence count (count) is added as exception occurrence information to the exception path in the exception profile. As a result, since only the count at which an exception has occurred is handled as exception occurrence information, the process is not affected by the exterior environment. It should be noted, however, that since the time concept is removed, an exception may occur because a threshold value is reached as a result of the process being performed for a long period of time. To avoid this phenomenon, when an exception path, the importance level of which is high, is registered as a target for a process for reducing exception handling costs, the exception occurrence count, which is included in exception occurrence information, is initialized (returned to 0).

EXAMPLE OPERATION 3

Figure 6:
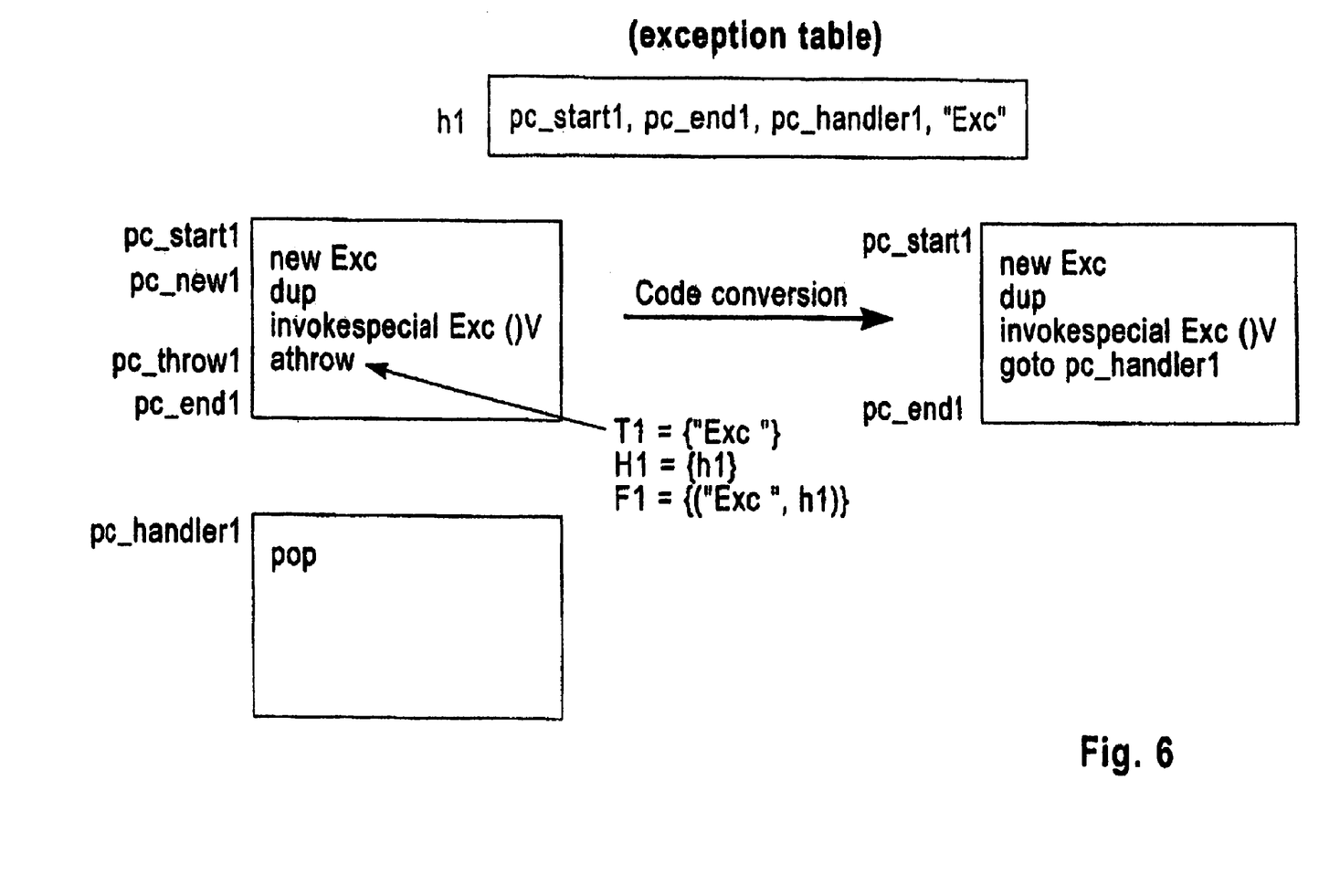
FIG. 6 is a diagram for explaining another operation for the embodiment, and shows an exception table, a byte code sequence that throws an exception, a byte code sequence for an exception handler, and a byte code sequence that throws an exception obtained by the compiler.

An explanation will now be given for an example operation for a method whereby the costs for performing a search for an exception is reduced by the conversion of code at the time compiling is performed. FIG. 6 is a diagram showing an exception table, a byte code sequence that throws an exception (from program counter pc_start1 to pc_end1), a byte code sequence for an exception handler (beginning with a program counter pc_handler1), and a byte code sequence that throws an exception obtained by the compiler 100. In the byte code sequence that throws an exception, the object of exception class Exc is generated at new Exc code; a pointer to the object is copied at dup; the object is initialized at invokespecial Exc( )V, using one of the copied pointers; and an exception is thrown at athrow using the other pointer. This is a typical code sequence that is frequently seen.

The code conversion in this embodiment is applied for athrow in program counter pc_throw1. First, it is recognized from the data flow analysis that an object of the Exc class generated by new Exc code is thrown. In this case, the exception type analyzer 120 identifies the exception type at pc_throw1 as T1={"Exc"}. Then, the exception handler analyzer 130 examines the exception table to obtain handler list H1={h1}, which covers pc_throw1. Subsequently, the handler h1 receives the exception class Exc. Next, the exception flow analyzer 140 analyzes the relationship in the exception flow between the class and an exception handler. As a result of the analysis, it is found that element h1 on the handler list H1 will receive element "Exc" of the exception type T1, and that exception flow set F1={("Exc", h1)} will be obtained. Following this, the branch converter 150 converts the code based on the analysis results obtained by the exception flow analyzer 140. Since in this example operation there is one exception flow, this process corresponds to step 303 in FIG. 3. Therefore, the branch converter 150 removes the "athrow" and inserts a "goto pc_handler1", which functions as a code describing a direct path from a point that throws an exception in an original code to the exception handler. Through this operation, the handler search costs in the compiling process can be removed.

EXAMPLE OPERATION 4

Figure 7:
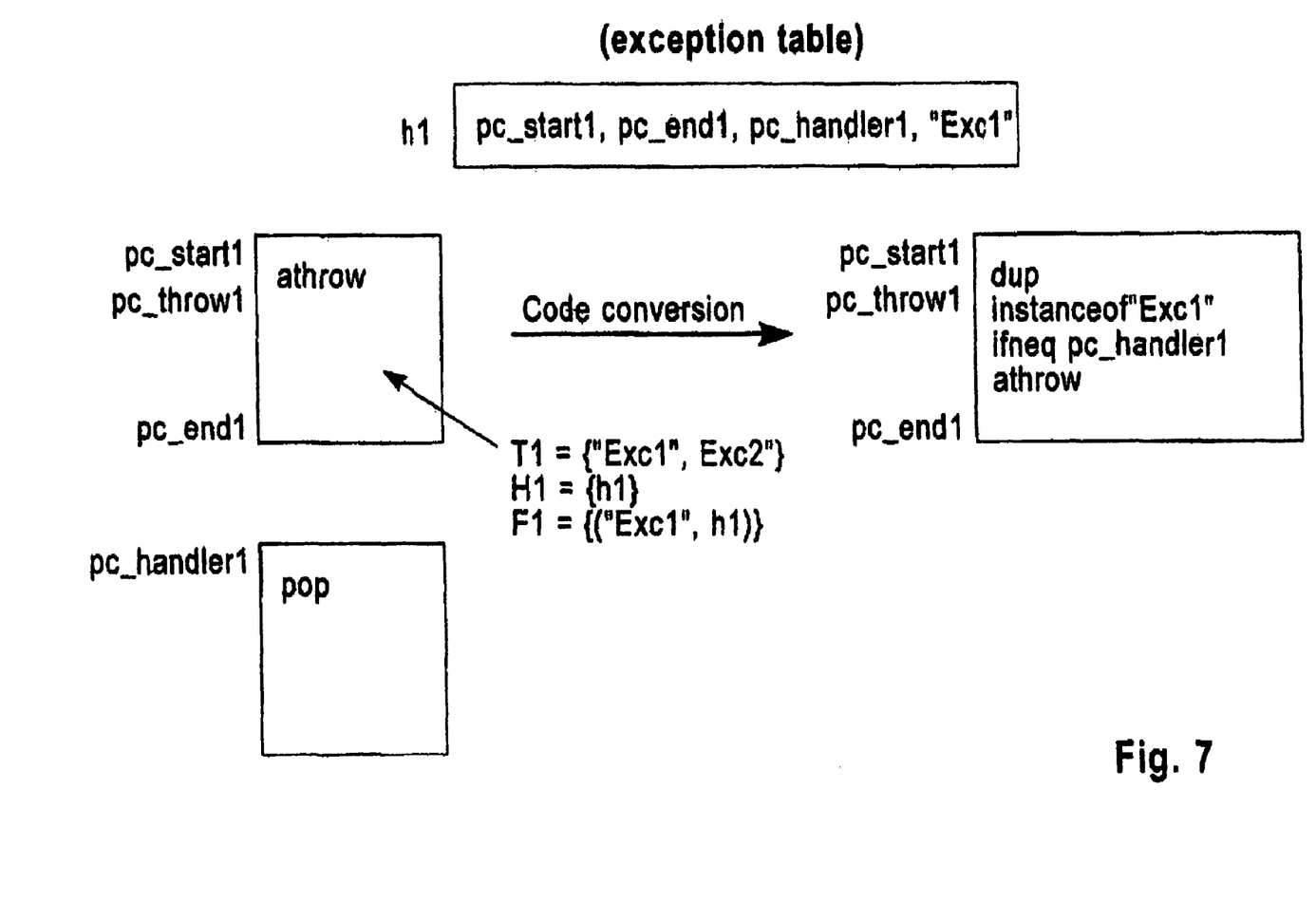
FIG. 7 is a diagram for explaining an additional operation for the embodiment, and shows an exception table, a byte code sequence that throws an exception, a byte code sequence for an exception handler, and a byte code sequence that throws an exception obtained by the compiler.

Since an operation wherein there is one exception flow has been explained as example operation 3, an explanation will now be given for an operation performed when there is a plurality of exception flows. FIG. 7 is a diagram showing an exception table, a byte code sequence that throws an exception (from program counter pc_start1 to pc_end1), a byte code sequence for a handler (beginning with program counter pc_handler1), and a byte code sequence that throws an exception obtained by the compiler 100. When compared with the byte code sequence in FIG. 6, it is found that the generation and initialization of an exception object do not fall within the compiling unit, and that exception objects for two classes can reach pc_throw1.

As in example operation 3, code conversion in the embodiment is applied for an athrow for program counter pc_throw1. First, it is found through data flow analysis that the objects of two classes Exc1 and Exc2, which are generated by another compiling unit, can reach pc_throw1, and it is further determined that the exception type analyzer 120 identifies an exception type in pc_throw1 as T1={"Exc1", "Exc2"}. Then, the exception handler analyzer 130 examines the exception table, and obtains handler list H1={h1}, which covers pc_throw1. In this case, handler h1 receives exception class Exc1, but does not receive Exc2. Following this, the exception flow analyzer 140 analyzes the relationship between the interests class and an exception handler in the exception flow, and as a result analysis, it is found that element h1 of handler list H1 receives element "Exc1", of exception type T1, and exception flow set F1={ ("Exc1", h1)} is obtained. Next, the branch converter 150 performs a code conversion process based on the analysis results obtained by the exception flow analyzer 140. Since there are a plurality of exception flows in this example operation, this process corresponds to step 302 in FIG. 3, and since exception class Exc2, which does not have an exception flow, is present, this process also corresponds to step 305 in FIG. 3. Therefore, the branch converter 150 removes the athrow, and determines whether the class for an exception to be thrown is Exc1 (instanceof Exc1). When the class is Exc1, code (ifneq pc_handler1) for branching to exception handler h1 is inserted. And when the class for the exception to be thrown is not Exc1, i.e., is Exc2, code for throwing an exception is inserted. Through this operation, the handler search cost required when the class of an exception to be thrown is Exc1 can be removed during the performance of the compiling process.

As is described above, according to the present invention, the required exception handling costs for a search performed for an exception handler can be effectively reduced, and the execution speed of the computer system can be improved. Further, according to the present invention, the process that actually affects the execution speed of the system can be dynamically optimized based on the frequency at which the exception handler search process is performed. As a result, the execution speed of the computer system can be improved.

What is claimed is:

1. A system for executing a program written in a programming language having an exception handling mechanism, said system comprising:
   an acquisition unit for obtaining exception path information including an exception path of an execution context, wherein said execution context had searched for an exception handler to handle an exception that occurred during execution of the program;
   an exception profile unit for storing exception information concerning the occurrence of an exception with said exception path information;
   a frequency calculator for calculating a frequency at which the exception occurred based on the stored exception information; and
   a determination unit for determining if the exception path is to be optimized based on the calculated frequency.

2. The system according to claim 1, wherein said frequency calculator calculates the frequency based on the number of exception occurrences within a predetermined time period.

3. A system comprising:
   a compiler for compiling a program written in a programming language having an exception handling mechanism and
   an execution unit for executing the compiled program;
   wherein said execution unit includes;
      means for calculating an occurrence frequency of an execution context wherein a search operation for an exception handler is performed for exception handling, and
      means for determining the execution context to be optimized based on said frequency, and
   wherein said compiler includes;
      means for determining the exception handler for handling an exception that occurs in said execution context, and
      means for generating a code to optimize an exception path describing a process path from a point that throws the exception in said execution context to the exception handler.

4. A method of handling an exception which occurs in a program written in a programming language having an exception handling mechanism, comprising the steps of:
   storing exception information including exception path and a number of exceptions which occur during execution of the program;
   calculating a frequency at which the exception occurs based on the exception information;
   determining and optimizing an execution context of the exception, based on calculated frequency; and
   wherein said frequency is calculated for each execution context wherein a search operation has been performed for an exception handler to handle the exception.

5. The method according to claim 4, wherein, said determining and optimizing step further comprises comparing said calculated frequency to a predetermined threshold and optimizing the execution context when the calculated frequency exceeds the predetermined threshold.

6. The method according to claim 4, wherein said frequency is calculated dynamically by counting the number of exception occurrences within a predetermined time period and normalizing a counted number based on a code execution speed corresponding to an execution state of the program.

7. The method according to claim 4, further comprising the step of registering the execution context using a catch method for catching the exception corresponding to the execution context.

8. The method according to claim 4, further comprising the steps of:
   determining an exception handler for handling the exception that occurs in the execution context, and
   generating a code that describes a direct path from a point that throws the exception in the execution context to the exception handler.

* * * * *